United States Patent [19]

Brennan

[11] 4,173,686

[45] Nov. 6, 1979

[54] SODIUM SULPHUR CELLS

[75] Inventor: Michael P. J. Brennan, Helsby, England

[73] Assignee: Chloride Silent Power Limited, London, England

[21] Appl. No.: 942,253

[22] Filed: Sep. 14, 1978

[30] Foreign Application Priority Data

Sep. 19, 1977 [GB] United Kingdom ............... 39025/77

[51] Int. Cl.$^2$ ............................................. H01M 6/20
[52] U.S. Cl. .................................................. 429/104
[58] Field of Search ........................ 429/101, 103, 104

[56] References Cited

U.S. PATENT DOCUMENTS

| | | | |
|---|---|---|---|
| 4,061,840 | 12/1977 | Jones et al. ........................... | 429/104 |
| 4,117,209 | 9/1978 | Markin et al. ........................ | 429/104 |
| 4,123,596 | 10/1978 | Robinson ............................. | 429/104 |

Primary Examiner—Donald L. Walton
Attorney, Agent, or Firm—Beveridge, DeGrandi, Kline & Lunsford

[57] ABSTRACT

In a sodium-sulphur cell, a cathode current collector, which extends into the cathodic region to provide a high conductivity current path, is formed of aluminium with a sheath over the surface of the aluminium or with finned elements secured to the aluminium, the sheath or fins being of a corrosion-resistant metal and being secured to the aluminium by bonding through a protective coating over the surface of the aluminium which serves to protect the aluminium from the cathodic reactant.

20 Claims, 4 Drawing Figures

SODIUM SULPHUR CELLS

BACKGROUND OF THE INVENTION

1. Field of the Invention

This invention relates to sodium sulphur cells in which a solid electrolyte, typically beta alumina, separates molten sodium from a cathodic reactant comprising sulphur and sodium polysulphides.

2. Prior Art

In a sodium sulphur cell, as the cell discharges, sodium ions pass through the electrolyte into the cathodic reactant to combine with negatively-charged sulphide ions to form the sodium polysulphides. On charging, the reverse action takes place. It is necessary to inject and to extract electrons from the cathode electrode. The molten sulphur/polysulphides however has a very poor electrical conductivity and it is the practice therefore to provide a porous conductive body such as a fibrous graphite or carbon matrix in the cathodic region. This matrix extends through the cathodic region and enables electrons to be supplied to and removed from the cathode reactant. The matrix must be porous to allow for the physical movement of the molten reactant material. In order to provide a current connection from an external circuit into the cathodic region, a current collector has to be provided which is connectible to an external circuit and which is in electrical contact with the aforementioned matrix material so that electrons can flow from the current collector into the matrix or vice versa.

It is of particular importance to have a small resistance in batteries for use in vehicles where often a very large power has to be extracted for a short time. A large current can only be drawn from the cell efficiently if the resistance of the cell is small. Thus one of the requirements for a sodium sulphur cell is to have a cathode current collector having a very low electrical resistance.

A major problem however in the construction of a cathode current collector for a sodium sulphur cell arises because the sulphur/polysulphide materials forming the cathodic reactant are highly corrosive. It is for this reason that a carbon or graphite matrix is commonly employed in the cathodic region. Carbon is not attacked by the cathodic reactant and thus is commonly used to form a porous conductive matrix despite the fact tht it has a relatively low electronic conductivity compared with many materials such as metals. Many cells are described in the literature employing stainless steel as a cathode current collector but the life of stainless steel in this cathodic reactant is short and such material is not considered acceptable except for laboratory type cells.

It is the common practice in sodium sulphur cells to make use of a tubular electrolyte, usually in the form of a tube closed at one end. In a tubular cell, the cathodic reactant may be put inside the electrolyte tube and the sodium around the outside of the tube within an outer housing. Such a cell is commonly referred to as a central sulphur cell. Alternatively the sodium may be put inside the electrolyte tube and the cathodic reactant around the outside of the electrolyte tube within an annular space between the electrolyte tube and the housing. Such a cell is commonly referred to as a central sodium cell. In a central sulphur cell, the cathode current collector conveniently is a rod or tube located axially within the electrolyte tube, the annular space between the current collector rod or tube and the electrolyte being filled with the matrix material impregnated with sulphur/polysulphides. Many such cells have been built with a solid carbon current collector rod. The conductivity of such a rod is not as good as would be desirable in order to make use of the high discharge currents which are possible with a sodium sulphur cell and, for this reason, a number of proposals have been made for current collector rods of more complex construction which would have a higher conductivity. For example in the U.S. Pat. Nos. 3,982,957, 4,061,840 and 4,066,826 there is described and claimed a construction in which a carbon or graphite tube is used with a core of much more highly conductive material e.g. aluminium and with a suitable deformable interface between the core and internal surface of the carbon or graphite tube to provide an electrically conductive path despite the different coefficients of thermal expansion of the core and tube. Such a current collector however requires that the carbon or graphite tube should be impermeable to the cathodic reactant and, whilst this can be achieved, it leads to a complex manufacturing operation and a relatively complex current collector construction. Other proposals have been made to coat a rod of material of high electrical conductivity with a conductive oxide or carbide coating or with a plurality of coatings in order to obtain the advantage of the high conductivity of the metal core whilst protecting that metal from any contact with the cathodic reactant. In such constructions, the integrity of the cell depends on the coating remaining intact to isolate the metal core from the cathodic reactant and this leads to relatively complex techniques to ensure proper coating.

In central sodium cells, the cathodic reactant is outside the electrolyte tube and it is the common practice to employ the housing as the cathode current collector. The housing is of relatively large surface area compared with the current collector in a central sulphur cell and hence the current density is smaller. It has been proposed for example to use a stainless steel housing with a protective coating of molybdenum or carbon. Once again however the integrity of the cell is dependent on the coating giving complete protection for the stainless steel.

It will be noted that in all these proposals for coated metal cathode current collectors, it is accepted that the coating must be of an electronically conductive material. This is because there must be an electrically conductive path between the metal substrate and the matrix material in the cathodic region of the cell.

BRIEF SUMMARY OF THE INVENTION

It is one of the objects of the present invention to provide an improved form of cathode electrode for a sodium sulphur cell.

According to one aspect of the present invention, in a sodium sulphur cell in which a solid electrolyte separates sodium from a cathodic reactant, there is provided a cathode current collector in contact with the cathodic reactant, which current collector comprises a substrate of a first metal which, at least on its surface exposed to the cathodic reactant, has a protective coating of a material chemically and electrically inert to the cathodic reactant, and an element or elements of a second metal bonded through the protective coating onto the substrate to be in electrical contact therewith, said element or elements being exposed to the cathodic reactant and being formed of a metal which is either chemically and electrochemically resistant to attack by the cathodic reactant or is coated with a corrosion-resistant electronically conductive coating.

The protective coating on the substrate may be electronically conductive or non-conductive. Conveniently this substrate is aluminium; it may have a coating, for example, of aluminium oxide which is non-conductive and gives a high measure of corrosion protection. Alternatively, it may have a conductive coating, e.g. a nickel coating. Aluminium has a particular advantage in that, if any part of it gets exposed to the cathodic reactant, that part will develop a protective coating. Because of the provision of said element or elements, it is immaterial that this protective coating is non-conductive.

In order to explain this invention, it is convenient to consider a more specific example. The substrate material is very conveniently aluminium or an aluminium alloy. In the following specification, reference to the substrate as being of aluminium is to be understood to include the use of an alloy predominantly of aluminium. This metal can readily be oxidised on its surface to have a complete protective coating of aluminium oxide. Aluminium oxide is not significantly electrically conductive and it would not be possible to use a simple aluminium rod or tube with an oxidised surface as a cathode current collector in a sodium sulphur cell. However a sheath or fins of a metal such as a nickel alloy, e.g. a nickel-chromium or a nickel-chromium iron alloy can be welded onto such a rod or tube; the welding process will break down the oxide coating and ensure electrical conductivity between the fins and the substrate metal. Any part of the aluminium surface which is not directly in electrical contact with the nickel chromium elements would, before assembly of the cell, be exposed to the air and would be oxidised. The aluminium may readily be deliberately oxidised to ensure a good protective coating. It will be seen that by this construction, a rod or tube can be formed of aluminium ensuring high conductivity along the length of the current collector but in which the aluminium is protected from attack by the cathodic reactant. The elements welded to the aluminium rod or tube however as resistant to the cathodic reactant and provide the necessary current path between the current collector and the matrix material in the cathodic reactant.

The sheath or fins may be formed, as described above, of a metal which is resistant to attack by the cathodic reactant or of a metal with a suitable corrosion-resistant coating, for example a carbon coating produced by a plasma-activated vapour deposition (PAVD) process; such a process enables a protective carbon coating which will withstand the conditions in the cathodic region of a sodium-sulphur cell to be deposited on certain metals. Such a coating can be deposited directly, for example, on a nickel-chromium alloy, which already has a high degree of corrosion resistance, for even greater corrosion resistance. In particular said element or elements may be formed of a metal which will accept a corrosion-resistant coating, such as PAVD carbon, which cannot be applied directly to aluminium.

In the case of a central sulphur cell, the current collector may be in the form of a rod or tube with a sheath of the more resistant material. There are particular advantages however is providing fins extending outwardly into the cathodic reactant. These fins may extend a substantial part of the way across the annular region between the current collector and the electrolyte. These fins provide a much higher conductivity path than graphite or carbon felt such as is commonly used as a matrix material in the cathodic reactant. By providing a suitable number of these fins, it becomes possible significantly to reduce the electrical resistance of the path through the cathodic region. In some cases, the matrix material may therefore be omitted. More generally however, a porous matrix, e.g. of carbon or graphite fibres, would be provided at least in the region immediately adjacent the electrolyte tube.

In the case of a central sodium cell, a cylinder of aluminium with an oxidised coating may be used around the cathodic region with fins of for example a nickel chromium material welded to the surface to extend inwardly towards the electrolyte tube. Such a cylinder may be fabricated from a sheet of aluminium or aluminium alloy. Fins may be welded on a pre-formed cylinder or onto the sheet before forming into the shape of the required housing. Again the fins may extend a substantial part of the radial distance across the cathodic region thereby giving the reduced electrical resistance in this region.

In the case of a tubular cell, fins are conveniently arranged on the aluminium substrate so as to lie in planes extending in the axial direction of the cell. The fins preferably are radial or substantially radial with respect to the axis of the cell. It will be noted that the conductivity of the current collector in the axial direction is provided primarily by the substrate which typically is of aluminium. The operation of the cell is not dependent on the integrity of any individual fin. The fins will be of a metal which does not have a conductivity as good as the aluminium substrate but they provide a good electrically conductive path of substantially greater conductivity than has been possible heretofore in constructions making use of cathode current collectors of carbon or graphite or having conductive oxide or carbide coating over a metal core.

In one form of construction, a plurality of elements are attached to the substrate, each in the form of a simple fin. Such an element may be formed as a flat plate, preferably with one edge bent over to form a surface for welding onto the substrate.

In another construction, each element is formed of a plate or sheet bent over to form a V with the top edges of the arms of the V welded to the substrate. As before these two edge portions may be bent over to give a larger surface area for welding. In yet another construction, an element for attachment to the substrate is formed of a sheet which is corrugated or otherwise shaped so as to have a number of regions where it may be attached to the substrate with other portions extending outwardly away from the substrate. With such a construction, a single element may be formed which covers the whole of the substrate, e.g. a single corrugated sheet. The surface of the substrate however has a protective coating, as previously described, to ensure the integrity of the construction in the event of any corrosion or breakdown of the corrugated element which might result in the cathodic reactant penetrating through that element to the substrate. If any part of the substrate surface becomes exposed in the cathodic region, it will become coated with a sulphide and/or oxide coating to give a protective layer.

The invention furthermore includes within its scope a sodium-sulphur cell in which a solid electrolyte separates sodium from a cathodic reactant, wherein there is provided a cathode current collector in contact with the cathodic reactant, which current collector is formed of aluminium with a protective coating and having fins of another metal heat sealed e.g. welded, to the aluminium through the protective coating and extending outwardly into the cathodic reactant, said other metal being a metal which is either chemically and electrochemically resistant to attack by the cathodic reactant or is coated with a corrosion-resistant electronically conductive coating. The aluminium is conveniently in the form of a rod or tube and, for a central sulphur tubular cell, may have radially extending fins formed of a nickel-chromium or nickel-chromium-iron alloy welded to the aluminium rod or tube. As explained above, these fins may have a PAVD carbon coating to give further protection.

The rod or tube conveniently is nickel-plated to facilitate welding of nickel-chromium fins to the aluminium using a spot-welding technique.

The fins preferably are made of thin sheet material. These fins conveniently lie in radial planes extending along the length of the rod or tube. They may extend substantially the whole width of the cathodic region to have outer edges near the surface of the electrolyte.

DESCRIPTION OF THE PREFERRED EMBODIMENTS

Figure 1:
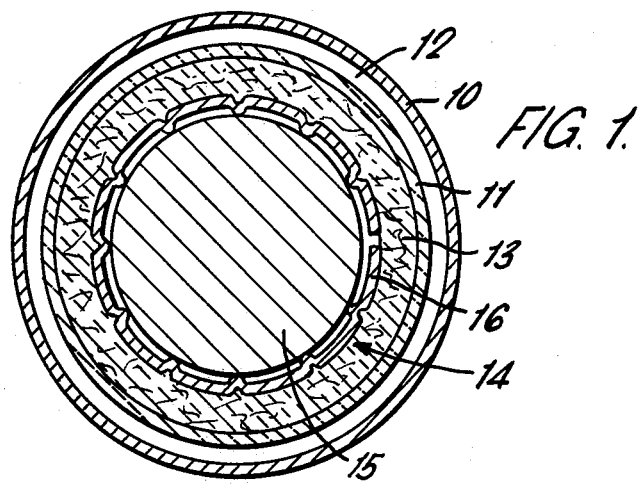
FIG. 1 is a diagrammatic cross section through a sodium sulphur cell.

Referring to FIG. 1 there is shown diagrammatically in cross section a sodium sulphur cell having an outer cylindrical casing 10, typically of stainless steel, containing a tube 11 of beta alumina forming an electrolyte. The region 12 between the electrolyte and the housing contains liquid sodium and, in the known way, may comprise capillary or wick means (not shown) to draw sodium upwardly from a reservoir to keep the outer surface of the electrolyte tube covered with a thin film of sodium. The present invention is concerned more particularly with the cathodic region of the cell and the cathode current collector. The sulphur/polysulphides forming the cathodic reactant is contained within the electrolyte tube 11 lying in the annular region 13 between the electrolyte tube 11 and a central cathode current collector 14. This annular region 13 includes a loose packing of carbon or graphite felt or other suitable electronically conductive material extending between the electrolyte tube 11 and the current collector 14 to provide an electronically conductive path; this packing is impregnated with the sulphur/polysulphide material which is liquid at the operating temperature of the cell.

The cathode current collector 14, in this particular embodiment, comprises a rod 15 or tube of aluminium which, at least on its outer surface, is covered with an aluminium oxide coating. Aluminium exposed to air will form an oxide coating on the exposed surface. Such a coating however may rapidly be formed over the whole surface by an anodising operation. If aluminium is exposed to the cathodic reactant a sulphide or mixed oxide/sulphide coating will be formed. Before the current collector is assembled into the cell, this aluminium tube 15 with its oxidised surface has a sheath 16 of a corrosion-resistant metal foil, e.g. of a nickel-chromium alloy, bonded onto the outer surface of the rod so as to extend substantially completely around the rod. The foil is secured to the rod by thermo-compression bonds, e.g. spot welds or seam welds at locations evenly spaced angularly about the axis of the rod. The welding of these fins can be effected through the oxidised coating which will break down during the welding operation to ensure that there is metal-to-metal bonding between the nickel chromium foil 16 and the aluminium tube 15. The foil thus is in electrical contact with the rod at each welded region. Apart from the weld regions however the foil may be spaced away from the rod. This rod externally has a protective oxide coating and thus is protected against corrosion in any regions where the cathodic reactant may come into contact with the rod.

Figure 2:
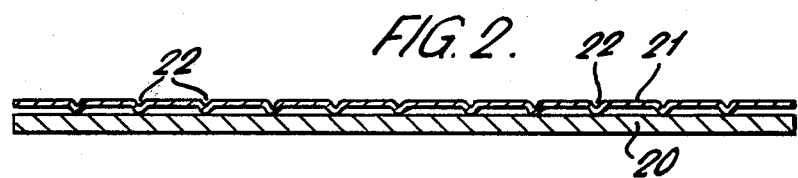
FIG. 2 is a section through a composite structure before rolling to form a cylindrical current collector.
Figure 3:
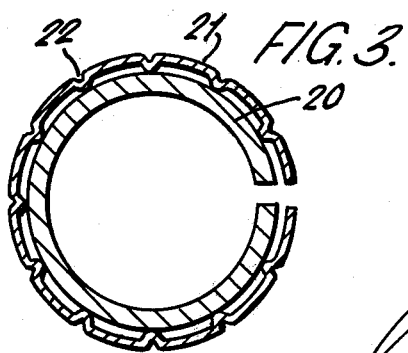
FIG. 3 is a cross-section through the current collector formed from the composite structure of FIG. 2.

FIGS. 2 and 3 illustrate another method of making a current collector for a tubular sodium sulphur cell of the central sulphur type, the current collector being arranged axially within the electrolyte tube. Referring to FIG. 2 a flat plate 20 of aluminium or aluminium alloy to form the substrate has bonded on one face a sheet of metal foil 21, e.g. nickel-chromium alloy foil. The bonding is thermo-compression bonding, e.g. spot or seam welds, at spaced locations 22 over the surface of the substrate, these locations being chosen to ensure good electrical contact between the foil and substrate in a plurality of regions evenly distributed over one face of the substrate. The substrate will have an aluminium oxide protective coating but the bonding is effected through this oxide layer. The composite assembly, comprising the plate 20 and foil 21 is then rolled into a cylindrical form as shown in FIG. 3. It is not essential to leave any gap between the foil 21 and plate 20 and, in some cases, continuous bonding over the whole surface may be effected. It is not necessary to join the two longitudinal edges to form a complete cylinder; the inner surface of the cylindrical assembly is protected by its oxide layer against corrosion by the cathodic reactant.

Figure 4:
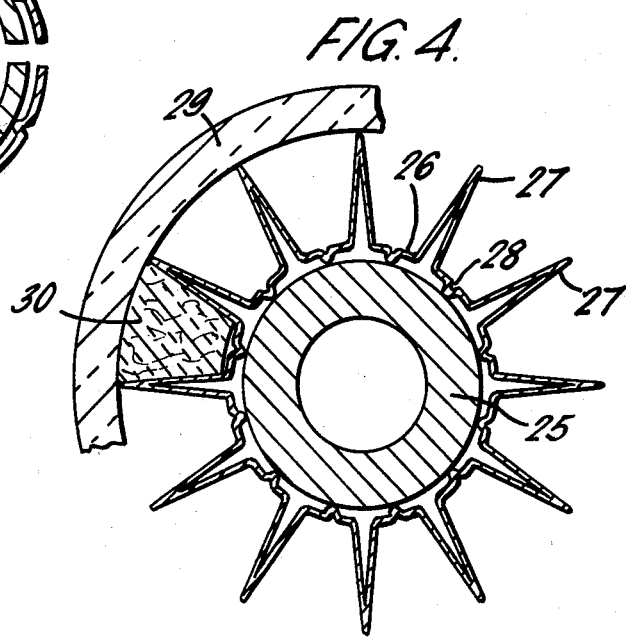
FIG. 4 is a cross-section through another construction of current collector for a sodium sulphur cell.

FIG. 4 illustrates yet another construction of cathode current collector for a sodium-sulphur cell of the central sulphur type. In FIG. 4 a tube 25 of aluminium or aluminium alloy has, as in the previous embodiments, a protective layer of aluminium oxide on its outer surface. A metal foil 26, e.g. a nickel-chromium alloy foil, is shaped, by folding, to form a plurality of fins 27 which extend longitudinally of the tube 25, the foil, between the fins, being secured, e.g. by spot or seam welding at 28, onto the tube 25 so as to make good electrical contact with the substrate. As illustrated, each fin conveniently comprises two layers of foil in a V-shape so that the whole fin and sheath assembly may be formed from a single foil element. The radial length of the fins is preferably such that they extend outwardly to have their tips close to but not in contact with a surrounding electrolyte tube 29. The cathode electrode is formed of trapezoidal elements fitting between the fins. For clarity in illustrating the current collector, only one such a trapezoidal element 30 is illustrated. Such an element is formed of fibre material, e.g. graphite or carbon felt impregnated with sulphur and may be shaped, when the sulphur is molten, allowed to cool and then inserted between the fins when the cell is assembled.

The use of fins extending outwardly from an aluminium rod or tube gives a significant reduction in the cell resistance.

The following are measurements of the resistances of two cells Nos. 1283 and 1281 of the central sulphur type having a central cathode current collector comprising a nickel-plated aluminium rod. Cell 1281 was without fins. Cell 1283 had fins of nickel-chromium alloy sheet 0.001 in. thick which were bonded to the current collector rod by spot welding.

1283 (Finned)—47.6 m$\Omega$=1.76$\Omega$cm$^2$
1281—75.2 m$\Omega$=3.03$\Omega$cm$^2$ The cell resistances were measured on the fourteen discharge of a repeated charge-discharge cycle. It will be seen that the average cell resistance for the finned construction was about 40% less than the average resistance for the non-finned construction.

Fins of a corrosion-resistant metal may be secured onto an aluminium rod or tube in a number of different ways. For example diffusion bonding could be employed or friction welding provided there is a direct metal-to-metal bond. A plurality of separate fin elements could be secured on an aluminium rod or tube if so desired. It is generally convenient to have the fins extending longitudinally in the cell although fins in planes normal to the axis of the cell could be used if so desired.

In the foregoing examples, reference has been made more particularly to the use of nickel-chromium alloy foil to form a corrosion-resistant electrically conductive material in contact with the cathodic reactant. Various nickel-chromium alloys may be used such as that sold under the trade names Nichrome or Inconel other materials which may be used are nickel or molybdenum or titanium or stainless steels (e.g. AlS/310 or 316). It will be noted that, in each of the examples, the main body of the current collector rod or tube is protected against corrosion quite independently of the sheath or fins which are in contact with the cathodic reactant. Thus any corrosion of the sheath or fins does not affect the integrity of the aluminium current collector rod or tube.

I claim:

1. A sodium sulphur cell in which a solid electrolyte separates sodium from a cathodic reactant, wherein there is provided a cathode current collector in contact with the cathodic reactant, which current collector comprises a substrate of a first metal which, at least on its surface exposed to the cathodic reactant, has a protective coating of a material chemically and electrically inert to the cathodic reactant, and at least one element of a second metal bonded through the protective coating onto the substrate to be in electrical contact therewith, said element being exposed to the cathodic reactant and being formed of a metal which is either chemically and electrochemically resistant to attack by the cathodic reactant or is coated with a corrosion resistant electronically conductive coating.

2. A sodium sulphur cell as claimed in claim 1 wherein said cathode current collector comprises a substrate of aluminium or aluminium alloy, said protective coating being of aluminium oxide.

3. A sodium sulphur cell as claimed in claim 1 wherein said cathode current collector comprises a substrate of aluminium or aluminium alloy, said protective coating being of nickel.

4. A sodium sulphur cell as claimed in claim 1 wherein an element of a second metal comprises at least one sheath element extending adjacent at least part of the coated substrate and secured thereto in a plurality of regions by welding through the coating so that said sheath element, at each weld, is in electrical contact with the substrate.

5. A sodium sulphur cell as claimed in claim 4 wherein said sheath element is at least partly spaced away from the coated substrate in the unwelded regions.

6. A sodium sulphur cell as claimed in claim 1 and having the electrolyte in the form of a tube with the cathodic reactant inside the tube wherein the substrate is a rod or tube and wherein said element extends around the cylindrical surface of the rod or tube.

7. A sodium sulphur cell as claimed in claim 1 wherein said element comprises a plurality of fins extending away from the surface of the substrate.

8. A sodium sulphur cell as claimed in claim 7 and wherein the cell is of tubular form with the cathodic reactant inside a solid electrolyte tube and wherein the fins lie in planes extending in the axial direction of the cell.

9. A sodium sulphur cell as claimed in claim 8 wherein each fin is formed by a V-shaped portion of metal foil.

10. A sodium sulphur cell as claimed in claim 9 wherein a single sheet of foil is arranged to form a plurality of fins around the tubular substrate.

11. A sodium sulphur cell as claimed in claim 1 wherein said second metal is nickel.

12. A sodium sulphur cell as claimed in claim 1 wherein said second metal is a nickel-chromium alloy.

13. A sodium sulphur cell as claimed in claim 1 wherein said second metal is stainless steel.

14. A sodium sulphur cell as claimed in claim 1 wherein said second metal is molybdenum.

15. A sodium sulphur cell as claimed in claim 1 wherein said second metal is titanium.

16. A sodium sulphur cell as claimed in claim 1 wherein said element of said second metal has an electronically conductive protective coating of a material chemically resistant to the cathodic reactant.

17. A sodium sulphur cell in which a solid electrolyte separates sodium from a cathodic reactant, wherein there is provided a cathode current collector in contact with the cathodic reactant, which current collector is formed of aluminium with a protective coating and having fins of another metal heat sealed to the aluminium through the protective coating and extending outwardly into the cathodic reactant, said other metal being a metal which is either chemically and electrochemically resistant to attack by the cathodic reactant or is coated with a corrosion-resistant electronically conductive coating.

18. A sodium sulphur cell as claimed in claim 17 wherein said current collector is in the form of a rod or tube and has radially extending fins formed of a nickel-chromium or nickel-chromium-iron alloy welded to the aluminium rod or tube.

19. A sodium sulphur cell as claimed in claim 18 wherein the rod or tube is nickel-plated.

20. A sodium sulphur cell as claimed in any of claims 17 to 19 wherein the fins are made of thin sheet material.

* * * * *